(12) United States Patent
Wang

(10) Patent No.: US 11,347,312 B1
(45) Date of Patent: May 31, 2022

(54) ULTRASONIC HAPTIC OUTPUT DEVICES

(71) Applicant: Apple Inc., Cupertino, CA (US)

(72) Inventor: Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/923,474

(22) Filed: Jul. 8, 2020

Related U.S. Application Data

(60) Provisional application No. 62/904,541, filed on Sep. 23, 2019.

(51) Int. Cl.
*G06F 3/01* (2006.01)
*B06B 1/02* (2006.01)
*G02B 27/01* (2006.01)

(52) U.S. Cl.
CPC ............ *G06F 3/016* (2013.01); *B06B 1/0207* (2013.01); *G02B 27/0176* (2013.01); *G06F 3/011* (2013.01); *G06F 3/017* (2013.01); *G02B 2027/0154* (2013.01)

(58) Field of Classification Search
CPC .......... G06F 3/016; G06F 3/011; G06F 3/017; G02B 27/0176; G02B 2027/0154
See application file for complete search history.

(56) References Cited

U.S. PATENT DOCUMENTS

| | | | |
|---|---|---|---|
| 10,032,345 | B2 | 7/2018 | Grant et al. |
| 10,133,353 | B2 | 11/2018 | Eid |
| 10,373,452 | B2 | 8/2019 | Maalouf et al. |
| 11,048,329 | B1* | 6/2021 | Lee ......................... G06F 3/016 |
| 2010/0085168 | A1* | 4/2010 | Kyung ................. G09B 21/003 340/407.1 |
| 2014/0104165 | A1 | 4/2014 | Birnbaum et al. |
| 2017/0267898 | A1* | 9/2017 | Singla ................. G06F 3/03545 |
| 2018/0164588 | A1* | 6/2018 | Leppanen ............ G02B 27/017 |
| 2018/0181201 | A1* | 6/2018 | Grant ...................... G06F 3/013 |

(Continued)

FOREIGN PATENT DOCUMENTS

FR 3092680 B1 * 5/2021 ........... B06B 1/0622

OTHER PUBLICATIONS

Sand et al., "Head-Mounted Display with Mid-Air Tactile Feedback", (Nov. 13, 2015), VRST '15: Proceedings of the 21st ACM Symposium on Virtual Reality Software and Technology, p. 51-58 (Year: 2015).*

*Primary Examiner* — Mong-Shune Chung
(74) *Attorney, Agent, or Firm* — Treyz Law Group, P.C.; Kendall P. Woodruff

(57) ABSTRACT

A system may include haptic output devices such as ultrasonic haptic output components that generate ultrasonic sound waves. The ultrasonic sound waves may be directed towards a user to provide haptic output. The haptic output devices may be used in a system that includes one or more electronic devices. Control circuitry may control the haptic output devices based on sensor data indicating where the user is located and/or based on what is being displayed for a user on a display. Ultrasonic haptic output may be used to simulate contact with a virtual object, to simulate rain, to simulate a breeze, and/or to simulate other sensations in a mixed reality or virtual reality environment. The ultrasonic haptic output components may be stand-alone devices or may be mounted in a head-mounted display, a gaming base station, a handheld controller, a finger-mounted device, or other electronic equipment.

17 Claims, 4 Drawing Sheets

(56) References Cited

U.S. PATENT DOCUMENTS

| | | | |
|---|---|---|---|
| 2018/0269807 A1* | 9/2018 | Khoshkava | G06F 3/0414 |
| 2018/0330584 A1 | 11/2018 | Heubel et al. | |
| 2019/0197844 A1* | 6/2019 | Levesque | G08B 6/00 |
| 2019/0212824 A1* | 7/2019 | Keller | G06F 1/163 |
| 2019/0324541 A1* | 10/2019 | Rihn | G06F 3/04815 |
| 2019/0369731 A1* | 12/2019 | Verbeke | H04R 1/025 |
| 2020/0057501 A1* | 2/2020 | Lacroix | G06F 3/033 |
| 2020/0201436 A1* | 6/2020 | Han | G06F 3/016 |
| 2020/0257366 A1* | 8/2020 | Gasset | G06F 3/011 |
| 2021/0018985 A1* | 1/2021 | Verbeke | H04N 9/3179 |

* cited by examiner

ULTRASONIC HAPTIC OUTPUT DEVICES

This application claims the benefit of U.S. provisional patent application No. 62/904,541, filed Sep. 23, 2019, which is hereby incorporated by reference herein in its entirety.

FIELD

This relates generally to electronic equipment, and, more particularly, to electronic equipment that supplies haptic output.

BACKGROUND

Devices such as wearable devices sometimes incorporate haptic output components. Haptic output components may supply a user with haptic output while the user is interacting with software such as gaming software.

It can be challenging to design a haptic output device. If care is not taken, haptic output may not provide a desired sensation for a user, haptic output may not be applied to an appropriate location on the body of a user, or a haptic output device may be overly bulky or difficult to use.

SUMMARY

A system may include haptic output devices such as ultrasonic haptic output components that generate ultrasonic sound waves. The ultrasonic sound waves may be directed towards a user to provide haptic output. The haptic output devices may be used in a system that includes one or more electronic devices such as a device with a display (e.g., a head-mounted display, a desktop computer display, a tablet computer display, a laptop computer display, a cellular telephone display, etc.).

Control circuitry may supply control signals to the haptic output devices based on sensor data indicating where the user is located and/or based on what is being displayed for a user on the display. Ultrasonic haptic output may be directed towards a user's hands, individual fingers, face, feet, legs, or other body part.

Ultrasonic haptic output may be used to simulate contact with a virtual object, to simulate rain, to simulate wind, and/or to simulate other sensations in a mixed reality or virtual reality environment. The ultrasonic haptic output components may be stand-alone devices or may be mounted in a head-mounted display, a gaming base station, a hand-held controller, a finger-mounted device, or other electronic equipment.

Ultrasonic haptic output components may be arranged in an array on a haptic output device. The ultrasonic haptic output components may include piezoelectric components, electroactive polymer components, electromagnetic actuators, and other haptic output components.

Ultrasonic haptic output components may be mounted to movable support structures. The movable support structures may move linearly along an axis and/or may rotate about a pivot point.

Ultrasonic haptic output devices may be removably mounted to an electronic device. The electronic device may have a recess that receives the ultrasonic haptic output device. The ultrasonic haptic output device may operate while located in the recess and/or may be removed from the recess and set on a surface for providing haptic output to a desired location on the user's body.

DETAILED DESCRIPTION

Figure 1:
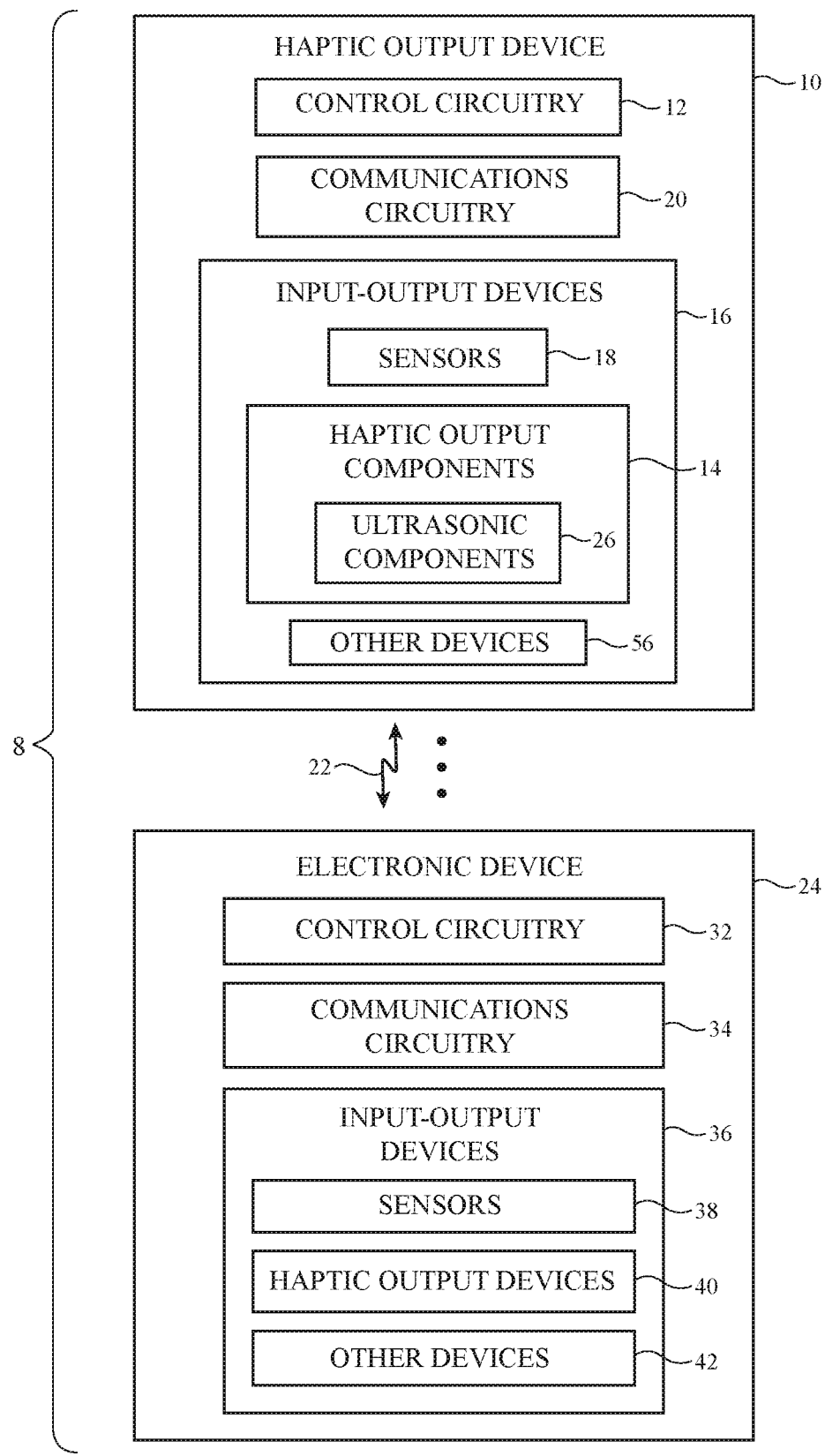
FIG. 1 is a schematic diagram of an illustrative system in accordance with an embodiment.

Electronic systems such as illustrative system 8 of FIG. 1 may include haptic output devices such as haptic output device 10. Haptic output device 10 may be a stand-alone device and/or may operate in conjunction with additional electronic devices such as electronic device 24. Device 10 may be used in supplying a user with haptic output. In one illustrative configuration, which may sometimes be described herein as an example, haptic output device 10 provides ultrasonic haptic output to a user.

In some configurations, device 10 may serve as a stand-alone device. A stand-alone haptic output device may be used independently and need not be used with external equipment. Battery power and/or power received wirelessly, via wired connection, or via an energy harvesting device in device 10 may be used in powering device 10. In some stand-alone arrangements, stand-alone devices may occasionally gather information from external equipment (e.g., settings, etc.) and/or may supply output to external equipment (e.g., usage history information, etc.). In other stand-alone arrangements, stand-alone devices are never coupled to external equipment.

In other configurations, device 10 serves as an accessory and is used exclusively or at least frequently in conjunction with another electronic device such as device 24. In this type of operating environment, device 24 may, as an example, be a computer or other device running a computer game or other software for a user and haptic output device 10 may communicate with the computer via a wired or wireless connection so that device 10 can provide a user with haptic output during the computer game.

System 8 may include a single haptic output device 10 (e.g., or may include multiple haptic output devices 10). In a system with multiple haptic output devices, the haptic output devices may be operated in coordination with each other. For example, a computer game may direct haptic output devices 10 in different locations to alternately supply a haptic output pulse, thereby creating a sensation of movement across the surfaces of the user's body (e.g., face, hands, legs, etc.). The operations associated with a single haptic output device 10 may sometimes be described herein as an example.

Haptic output devices such as device 10 may be used in conjunction with any suitable electronic equipment. For example, haptic output devices 10 may provide haptic output to a user as the user interacts with electronic equipment such as a virtual reality or mixed reality system (e.g., a head-mounted device with a display), a desktop computer, tablet computer, cellular telephone, watch, ear buds, or other accessory, or other electronic equipment.

Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a voice-controlled internet-connected speaker (e.g., an artificial intelligence assistance device, home assistant, etc.), a set-top box, a computer base station, a gaming base station, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

Haptic output device 10 may be separate from electronic device 24 (e.g., physically separate and, if desired, coupled to device 24 via a wired or wireless signal path) and/or may be part of electronic device 24. Haptic output device 10 may be removably attached to electronic device 24 (e.g., so that a user can physically remove haptic output device 10 from device 24) or may be non-removably integrated into device 24. In arrangements where haptic output device 10 forms part of electronic device 24, control circuitry 12, communications circuitry 20, and input-output devices 16 of device 10 may replace, may be replaced by, or may be shared with control circuitry 32, communications circuitry 34, and input-output devices 36 of device 24. For simplicity, control circuitry 12, communications circuitry 20, and input-output devices 16 may be used to describe the circuitry associated with haptic output device 10, although it should be understood that control circuitry 32, communications circuitry 34, and input-output devices 36 may be used instead in arrangements where device 10 is part of device 24 and/or where device 10 is used in conjunction with device 24.

Devices 10 and 24 may include control circuitry 12 and 32, respectively. Control circuitry 12 and 32 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 32 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 20 and/or control circuitry 32 may communicate using communications circuitry 34. Circuitry 20 and/or 34 may include antennas, radio-frequency transceiver circuitry, and other wireless communications circuitry and/or wired communications circuitry. Circuitry 20 and/or 34, which may sometimes be referred to as control circuitry and/or control and communications circuitry, may, for example, support bidirectional wireless communications between devices 10 and 24 over wireless link 22. Wireless link 22 may be a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 36. Input-output devices 16 and/or 36 may be used in gathering user input, in gathering information on the environment surrounding the user, and/or in providing a user with output. Devices 16 may include sensors 18 and devices 36 may include sensors 38. Sensors 18 and/or 38 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors (e.g., ultrasonic sensors for tracking device orientation and location and/or for detecting user input such as finger input), and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 38 and/or other input-output devices 16 and/or 36 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and that optionally can be depressed to select items of interest). Alphanumeric keys and/or other buttons may be included in devices 16 and/or 36. In some configurations, sensors 18 and/or sensors 38 may include joysticks, roller balls, optical sensors (e.g., lasers that emit light and image sensors that track motion by monitoring and analyzing changings in the speckle patterns and other information associated with surfaces illuminated with the emitted light as device 10 and/or device 24 is moved relative to those surfaces), fingerprint sensors, and/or other sensing circuitry. Radio-frequency tracking devices may be included in sensors 18 and/or sensors 38 to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10 and/or 24 to help determine the location and position of devices 10 and/or 24 relative to the beacons. If desired, devices 10 and/or 24 may include beacons. Frequency strength (received signal strength information), beacon orientation, time-of-flight information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used). If desired, light-based beacons, ultrasonic beacons, and/or other beacon devices may be used in system 8 in addition to or instead of using radio-frequency beacons and/or radio-frequency radar technology.

Devices 16 and/or 36 may include haptic output devices 14 and/or 40. Haptic output devices 14 and/or 40 can produce sensations on the user's body (e.g., hands, head, body, legs, etc.). Haptic output devices 14 and/or 40 may include actuators such as electromagnetic actuators, motors, piezoelectric actuators, electroactive polymer actuators, capacitive actuators, vibrators, linear actuators (e.g., linear resonant actuators), rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24).

Haptic output components 14 may include transducers that are configured to emit and/or detect acoustic waves (e.g., audible acoustic waves and/or ultrasonic acoustic waves). Haptic output components 14 may be formed using transducers that also double as speakers and/or microphones in device 10 and/or in device 24, if desired. Haptic output components 14 may include ultrasonic components 26. Ultrasonic components 26 (sometimes referred to as ultrasonic haptic output devices, haptic output components, or ultrasonic haptic output components) may include one or more ultrasonic transducer elements (e.g., piezoelectric transducers, capacitive transducers, transducers formed from coils and magnets, transducers formed from electroactive polymer, etc.) that emit ultrasonic sound signals (e.g., ultrasonic vibrations) toward the user. Because ultrasonic sound signals travel distances through space, the use of ultrasonic components 26 allows haptic output components 14 to provide haptic output to the user from a distance (e.g., without requiring that haptic output components 14 be in contact with the user's body).

Ultrasonic components 26 may emit vibrations with a piezoelectric device or other transducer that generates movement in response to an electrical input signal (e.g., in response to control signals from circuitry 12). With one illustrative arrangement, signals emitted by ultrasonic components 26 of device 10 have frequencies of at least 40 kHz, at least 100 kHz, at least 200 kHz, at least 1 MHz, less than 2 MHz, less than 800 kHz, less than 500 kHz, or other suitable frequencies. Configurations in which ultrasonic components 26 handle sub-ultrasonic frequencies (e.g., 10 kHz) may also be used, if desired. Arrangements in which ultrasonic components 26 are configured to emit both ultrasonic waves and audible sound waves may also be used. With this type of configuration, ultrasonic components 26 may form speakers in device 10 and/or device 24.

If desired, ultrasonic components 26 may include ultrasonic transducers and ultrasonic sensors. The transducers and sensors may be separate components and/or may be formed from a single transducer that can both emit and detect ultrasonic signals (simultaneously, if desired). The ultrasonic sensors may be used to measure distance by emitting vibrations with a piezoelectric device or other transducer that generates movement in response to an electrical input signal and measuring the vibrations after the vibrations have been reflected from and modified (e.g., damped) by an object or user. Time-of-flight measurement techniques, phase difference measurement techniques, and/or other measurement techniques may be used to determine the position of and/or distance to objects of interest (e.g., a user's fingers, hands, eyes, etc.) using the emitted and detected ultrasonic signals.

If desired, input-output devices 16 and/or 36 may include other devices 56 and/or 42 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals.

Figure 2:
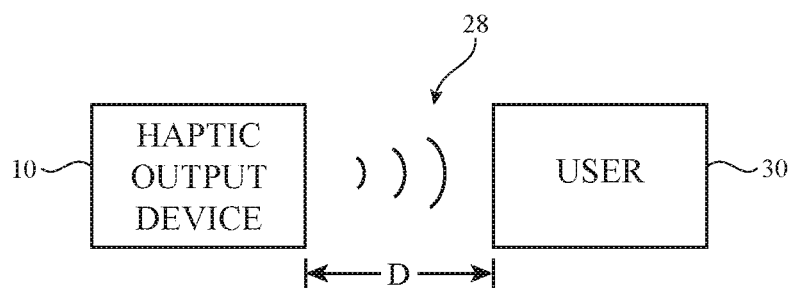
FIG. 2 is a diagram showing how an ultrasonic haptic output device may provide haptic output that travels a given distance to reach the user in accordance with an embodiment.

FIG. 2 is a diagram illustrating how haptic output device 10 may be configured to provide haptic output to a user from a distance. As shown in FIG. 2, haptic output device 10 may be located a distance D from user 30. Haptic output device 10 may be a stand-alone device, may be integrated into an electronic device such as device 24 of FIG. 1, and/or may be a device that is physically separate from device 24 but that is used in conjunction with device 24.

Haptic output device 10 may include ultrasonic components 26 (e.g., an ultrasonic transducer as described in connection with FIG. 1) that generates ultrasonic signals 28. Ultrasonic signals 28 may travel across distance D to reach user 30. User 30 may feel vibrations (e.g., air being pushed against user 30) in the location(s) where ultrasonic signals 28 strike user 30. For example, haptic output device 10 may direct ultrasonic signals 28 towards a user's face, hand, individual fingers, feet, legs, torso, or other suitable body location. Distance D may be a relatively small distance (e.g., 1 mm, 5 mm, 10 mm, 100 mm, 1 cm, 10 cm, 100 cm, less than 10 cm, greater than 10 cm, etc.) or distance D may be a relatively large distance (e.g., 1 m, 5 m, greater than 5 m, less than 5 m, etc.). One or more of haptic output devices 10 may include a movable support structure that moves linearly along an axis and/or that rotates about a pivot point to provide haptic output 28 in different directions.

Haptic output 28 may be provided in response to a user input and/or may be provided in response to content being watched on a display (e.g., a head-mounted display, desktop computer display, tablet computer display, laptop computer display, cellular telephone display, etc.). The user input that triggers haptic output 28 may be a movement of the user's body (e.g., fingers, hands, eyes, head, etc.) that is detected using one or more sensors in device 10 and/or device 24 (e.g., sensors such as a visible light camera, an infrared light camera, a three-dimensional image sensor, a dot projector or other structured light illuminator, etc.). The displayed content that triggers haptic output 28 may be two-dimensional displayed content, may be three-dimensional displayed content, may be displayed content associated with a virtual reality, mixed reality, and/or augmented reality environment, and/or may be displayed content that is not associated with any virtual reality, mixed reality, or augmented reality environment.

Figure 3:
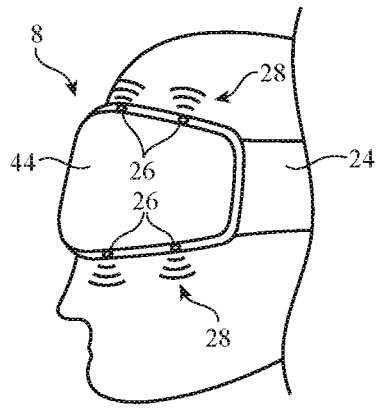
FIG. 3 is a perspective view of an illustrative head-mounted device having ultrasonic haptic output components that provide haptic output to a user's face in accordance with an embodiment.

FIG. 3 is a perspective view of an illustrative electronic device that may include ultrasonic haptic output components. In the example of FIG. 3, ultrasonic haptic output components 26 are located in a head-mounted display such as head-mounted display 24 (sometimes referred to as a head-mounted device). Head-mounted device 24 may be worn on a user's head and may include a display such as display 44 that displays images for the user.

While a user is wearing head-mounted display 24, ultrasonic components 26 may emit ultrasonic vibrations 28 towards a user's face. These ultrasonic vibrations 28 may be used to provide haptic feedback associated with the content being watched on display 44. For example, vibrations 28 may be used to simulate virtual environmental conditions (e.g., a virtual breeze, virtual rain, etc.), to provide locational awareness, to warn the user of an impending collision with a real or virtual object, and/or to provide other sensations on the user's face. Control circuitry 12 may control components 26 based on the content being displayed on display 44 and/or based on sensor data (e.g., data from sensors 18 in device 10, sensors 38 in head-mounted display 24, and/or sensors in other electronic devices that are used in conjunction with head-mounted display 24 such as a computer, a gaming device, etc.). Ultrasonic vibrations 28 may be emitted towards portions of the user's face that are uncovered by device 24 and/or may be emitted towards portions of the user's face that are covered by device 24 (e.g., toward the user's eye area, areas of the face surrounding the eye, and/or the areas of the face where device 24 is mounted).

Figure 4:
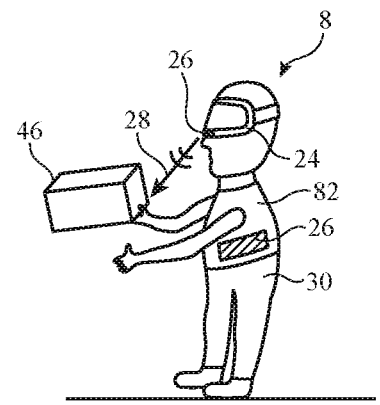
FIG. 4 is a perspective view of an illustrative head-mounted device having ultrasonic haptic output components that provide haptic output to a user's hand to simulate contact with a virtual object in accordance with an embodiment.

FIG. 4 is a perspective view of an illustrative electronic device that is being used to provide ultrasonic haptic output to simulate contact with a virtual object. In the example of FIG. 4, ultrasonic components 26 are located in head-mounted device 24. During a computer game or other computer program (e.g., when a user is wearing head-mounted device 24 and/or in a virtual reality or mixed reality environment provided with other equipment), control circuitry 12 may use components 26 to supply haptic output that provides a user with a sensation of shear force on the user's hands (e.g., rendering friction, slipping sensations, etc.), that provides the user with a sensation of increased normal force on the hands of the user, and/or other haptic sensations. The haptic output that is provided by components 26 may be provided based at least partly on feedback on user hand movement and/or other information that is gathered with motion sensors (e.g., inertial measurement units) and/or other sensors 18 in device(s) 10 and/or based on information received from device 24 (e.g., wirelessly received information such as haptic information associated with a game). Haptic output components 26 may be used to provide a user with sensations of continuous movement, continuous slipping, and/or other sensations during use of system 8.

As shown in FIG. 4, for example, components 26 in device 24 may emit ultrasonic signals 28 towards a user's hands to simulate contact with virtual object 46. Control circuitry 12 may adjust the ultrasonic vibrations 28 (e.g., the frequency, amplitude, etc.) to achieve the desired sensation for user 30 (e.g., more intense vibrations may be used to simulate contact with a rigid object, light vibrations may be used to simulate contact with a soft object, etc.).

FIG. 4 also shows that haptic output component 26 may be incorporated into other wearables such as wearable item 82. Wearable item 82 may be a shirt, a belt, a belt clip, a pair of pants, or other wearable item that includes one or more haptic output devices (e.g., devices 10 of FIG. 1). If desired, components 26 in wearable item 82 may be used to provide ultrasonic haptic output to user 30. The ultrasonic vibrations produced by components 26 in wearable item 82 may be directed towards a user's arms, hands, fingers, feet, torso, or other body part. Components 26 in wearable item 82 may be controlled using control circuitry in item 82, using control circuitry in head-mounted device 24, and/or using control circuitry in other electronic equipment. The haptic output generated by components 26 may be based on the content being displayed on head-mounted device 24 and/or may be unrelated to the content being displayed on head-mounted device 24.

Figure 5:
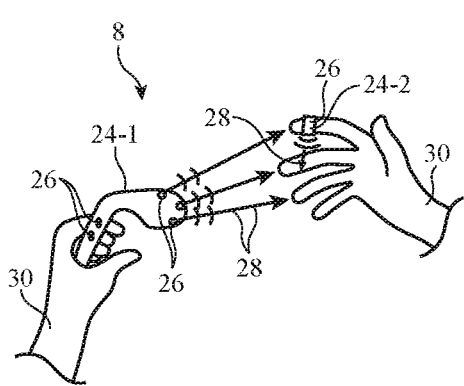
FIG. 5 is a perspective view of an illustrative controller and finger device having ultrasonic haptic output components in accordance with an embodiment.

FIG. 5 is a perspective view of an illustrative arrangement in which ultrasonic haptic output components are incorporated into a handheld controller and/or into one or more finger devices. As shown in FIG. 5, electronic devices 24 may include handheld controller 24-1 and/or finger device 24-2. Handheld controller 24-1 may be a gaming controller for a game system, a remote control for a television or other electronic equipment, or other handheld device that user 30 can use to control other electronic equipment. Handheld controller 24-1 may include ultrasonic haptic output devices 26 to provide ultrasonic haptic output 28 to a user's fingers. Haptic output 28 may be directed towards the fingers of the hand that is holding device 24-1 and/or may be directed towards the fingers of the hand that is not holding device 24-1.

Finger devices such as finger device 24-2 may be worn on one or more of a user's fingers, and may sometimes be referred to as finger-mounted devices, may be used to gather user input and to supply output. A finger device may, as an example, include an inertial measurement unit with an accelerometer for gathering information on figure motions such as finger taps or free-space finger gestures, may include force sensors for gathering information on normal and shear forces in the finger device and the user's finger, and may include other sensors for gathering information on the interactions between the finger device (and the user's finger on which the device is mounted) and the surrounding environment. The finger device may include a haptic output device such as ultrasonic haptic output components 26 to provide the user's finger(s) with haptic output 28 and may include other output components. Ultrasonic haptic output 28 may be directed towards the user's adjacent fingers (e.g., the fingers adjacent to the finger wearing device 24-2) and/or may be directed towards the fingers on the opposite hand of user 30 (e.g., the hand that does not have finger-mounted devices 24-2).

User 30 may use controller 24-1 and/or finger devices 24-2 in operating a virtual reality or mixed reality device (e.g., head-mounted equipment such as glasses, goggles, a helmet, or other device with a display). During operation, controller 24-1 and/or finger devices 24-2 may gather user input such as information on interactions between the finger device(s) 24-2 and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using components 26. Haptic output 28 may be used, for example, to provide the fingers of a user with a desired texture sensation as a user is touching a real or virtual object and/or may be used to simulate virtual ambient conditions (e.g., virtual wind, virtual rain, etc.). Haptic output can also be used to create detents and other haptic effects.

Finger devices such as devices 24-2 can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices 24-2 may have inverted U shapes or other configurations that allow the finger devices to be worn over the top and sides of a user's finger tips while leaving the user's finger pads exposed. This allows a user to touch objects with the finger pad portions of the user's fingers during use. If desired, finger devices 24-2 may be worn over knuckles on a user's finger, between knuckles, and/or on other portions of a user's finger. The use of finger devices on a user's finger tips is sometimes described herein as an example.

Users can use controller 24-1 and/or finger devices 24-2 to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, ear buds, or other accessory, or to interact with other electronic equipment.

Figure 6:
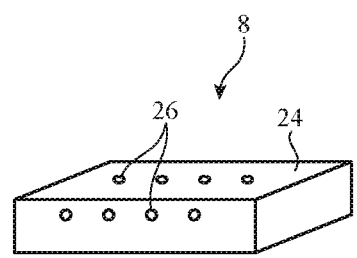
FIG. 6 is a perspective view of illustrative electronic equipment having an array of ultrasonic haptic output components in accordance with an embodiment.

FIG. 6 is a perspective view of an illustrative arrangement in which an electronic device incorporates an array of ultrasonic haptic output components. Electronic device 24 of FIG. 6 may be a gaming base station, a computer base station, or other electronic equipment. In some arrangements, device 24 may be used in conjunction with other electronic equipment such as a television, a display, a virtual reality or mixed reality device (e.g., head-mounted equipment such as glasses, goggles, a helmet, or other device with a display). In other arrangements, device 24 may be used on its own.

As shown in FIG. 6, device 24 may include an array of ultrasonic components 26. Ultrasonic components 26 may be located on one or more surfaces of device 24. There may be one, two, three, ten, fifty, more than fifty, or less than fifty ultrasonic components 26 on device 24. Components 26 may be configured to direct ultrasonic haptic output towards a user as a user interacts with device 24 and/or as a user interacts with other electronic equipment (e.g., other devices 24 in system 8). Components 26 may all be identical to one another, or components 26 may have different structures (e.g., ultrasonic transducers of different types, sizes, shapes, output capabilities, etc.). Components 26 may be located on some or all of the surfaces of device 24.

Figure 7:
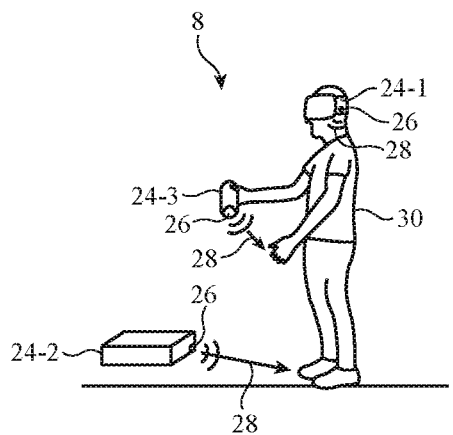
FIG. 7 is a perspective view of illustrative electronic devices having ultrasonic haptic output components that provide haptic output to different parts of a user's body in accordance with an embodiment.

FIG. 7 is a perspective view of an illustrative arrangement in which ultrasonic haptic output components are incorporated into multiple electronic devices and used to provide haptic output to different parts of the user's body. In the example of FIG. 7, electronic devices 24 include head-mounted device 24-1, gaming computer base station 24-2, and handheld controller 24-3. Ultrasonic components 26 in head-mounted device 24-1 may be used to provide ultrasonic haptic output 28 to the face of user 30, ultrasonic components 26 in gaming computer base station 24-2 may be used to provide ultrasonic haptic output 28 to the feet or legs of user 30, and ultrasonic components 26 in handheld controller 24-3 may be used to provide ultrasonic haptic output 28 to the hands (e.g., fingers) of user 30 (as examples). Control circuitry 12 may control haptic output components 26 based on sensor data and/or based on content being displayed on head-mounted device 24-1. The use of haptic output components 26 in multiple devices 24 may allow haptic output 28 to reach different parts of the user's body at the same time, which in turn may provide a more immersive experience for the user in a virtual or mixed reality gaming scenario.

If desired, haptic output components 26 may be used to provide haptic output to individuals that are within the vicinity of user 30. For example, device 24-1 may provide haptic output 28 to one or more persons near user 30 to share the virtual reality experience with others around user 30. The haptic output that is provided to individuals (sometimes referred to as secondary users) around user 30 may be associated with displayed content that user 30 is viewing, may be associated with content that is displayed on an external (e.g., outward-facing) display on device 24-1, may be associated with audio that device 24-1 is providing to user 30, and/or may be associated with input from user 30 or input from one or more individuals near user 30.

Figure 8:
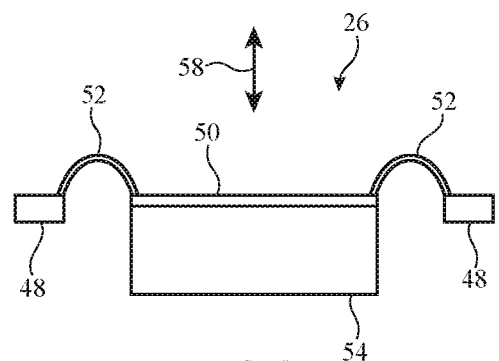
FIG. 8 is a cross-sectional side view of an illustrative ultrasonic haptic output device in accordance with an embodiment.

FIG. 8 is a cross-sectional side view of illustrative ultrasonic haptic output components that may be used in device 10 and/or device 24. As shown in FIG. 8, ultrasonic haptic output components 26 may include a transducer such as ultrasonic transducer 54 that vibrates a membrane such as membrane 50. Ultrasonic transducer 54 may be an electromagnetic actuator, a piezoelectric actuator, a capacitive transducer, a transducer formed from electroactive polymer, or other suitable actuator. Electromagnetic actuators may include a coil and a corresponding magnet. When current is applied to the terminals of the coil, a magnetic field is generated by the coil. This magnetic field produces a force between the magnet and the coil which causes the magnet and coil to move relative to each other (e.g., vertically in the orientation of FIG. 8), which in turn causes membrane 50 to vibrate in direction 58. Transducer 54 may use a moving coil design in which the coil is moved when current is applied to its terminals or a moving magnetic design in which the magnet is moved when current is applied to the terminals of the coil. Any suitable geometry may be used for an electromagnetic actuator (rotary, linear, etc.).

The use of an electromagnetic actuator in components 26 is merely illustrative. If desired, transducer 54 may be a piezoelectric actuator (e.g., piezoelectric material with terminals that receive control signals that cause the piezoelectric material to vibrate membrane 50), an electroactive polymer that vibrates membrane 50 in response to control signals, a capacitive transducer, or other suitable transducer.

A suspension structure such as suspension structure 52 may be used to attach portions of membrane 50 to a rigid support structure such as support structure 48. Support structure 48 may be part of a housing of device 10 and/or device 24, or may be a separate support structure with an electronic device housing. Suspension structure 52 may prevent or minimize lateral movement of membrane 50 while allowing free motion of membrane 50 in directions 58. Suspension structure 52 may be formed from an elastomeric material, foam material, resin coated material, other suitable materials, or a combination of these materials. As shown in the example of FIG. 8, suspension structure 52 may form a pliant interface between membrane 50 and support structure 48.

Figure 9:
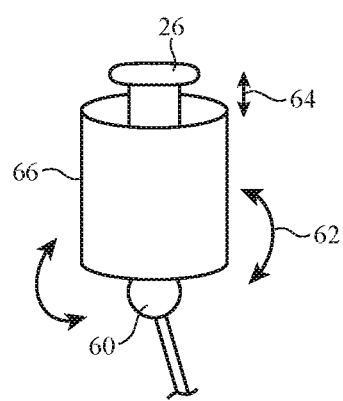
FIG. 9 is a perspective view of illustrative ultrasonic haptic output components mounted to a movable support structure so that haptic output can be provided in different directions in accordance with an embodiment.

FIG. 9 is a perspective view of an illustrative arrangement in which ultrasonic components are mounted on a pivot mechanism. As shown in FIG. 9, ultrasonic components 26 may be mounted to a support structure such as movable support structure 66. Support structure 66 may be configured to move linearly along direction 64 and/or to rotate freely about pivot point 60 (e.g., in directions 62). Control circuitry 12 may control the position of support structure 66 (and therefore the position of haptic output components 26) based on sensor data (e.g., sensor data indicating where the user is located and therefore where haptic output should be directed) and/or based on content that is being viewed by a user on a display (e.g., a head-mounted display, a television, a computer, etc.). For example, ultrasonic component 26 may provide haptic output in a first direction towards a user's hands to simulate contact with a virtual object, and may provide haptic output in a second direction towards a user's face to simulate a breeze. If desired, some haptic output components 26 in system 8 may be provided with a movable support structure 66 (e.g., to provide haptic output in different directions) while other haptic output haptic output components 26 in system 8 may be fixed (e.g., may only generate haptic output in a single direction).

Figure 10:
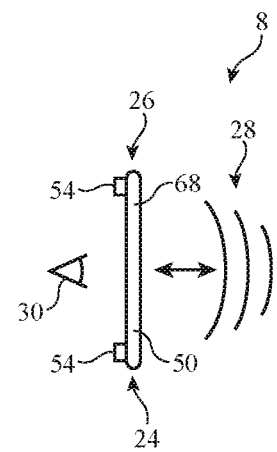
FIG. 10 is a side view of an illustrative head-mounted device with ultrasonic haptic output components that operate through a display in accordance with an embodiment.

FIG. 10 is a cross-sectional side view of an illustrative arrangement in which ultrasonic components are formed at least partly using existing structures in an electronic device. In the example of FIG. 10, device 24 may be a head-mounted device having a display 68. Display 68 may form a movable membrane that is vibrated by transducers in ultrasonic components 26. In particular, one or more transducers 54 may be mounted behind display 68 and may be used to vibrate display 68 (or portions of display 68) to produce ultrasonic signals 28. Display 68 may be a rigid display or may be a flexible display having one or more flexible polymer layers. Transducers 54 may be used to vibrate the entirety of display 68 or may be used to vibrate only a portion of display 68.

Figure 11:
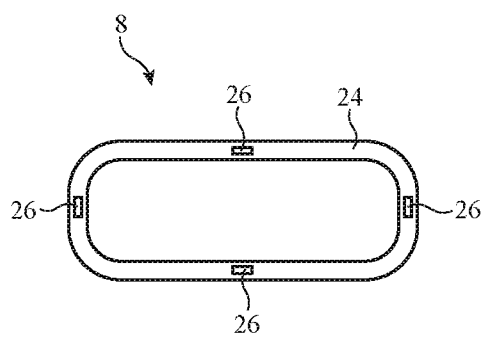
FIG. 11 is a front view of an illustrative head-mounted device with ultrasonic haptic output components at discrete locations around a periphery of a display in accordance with an embodiment.

FIG. 11 is a front view of an illustrative arrangement in which ultrasonic components are mounted in discrete locations around a head-mounted display. As shown in FIG. 11, device 24 may include ultrasonic components 26 at first, second third, and fourth locations around the periphery of head-mounted display 24. There may be greater or fewer than four ultrasonic components 26 in device 24. The example of FIG. 11 is merely illustrative.

Figure 12:
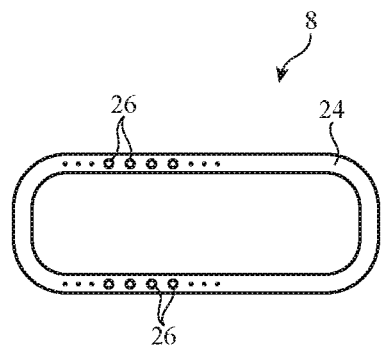
FIG. 12 is a front view of an illustrative head-mounted device with ultrasonic haptic output components that surround a periphery of a display in accordance with an embodiment.

As shown in FIG. 12, ultrasonic components 26 may be mounted in an array that extends continuously around the periphery of head-mounted display 24.

Figure 13:
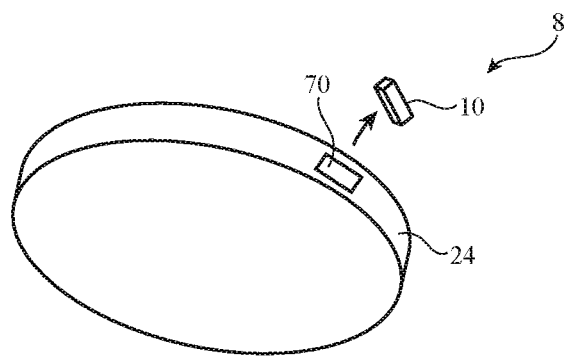
FIG. 13 is a perspective view of an illustrative head-mounted device with an ultrasonic haptic output device that can be detached from the head-mounted device in accordance with an embodiment.

FIG. 13 is a perspective view of an illustrative arrangement in which an electronic device has a haptic output device that can be removed and used separately from device 24. As shown in FIG. 13, electronic device 24 may include one or more recesses such as recess 70 that receives haptic output device 10. Haptic output device 10 may be used to provide haptic output while it is housed in device 24 and/or while it is separate from device 24. When device 10 is received within recess 70, it may be used to provide haptic output to the user's face (e.g., in arrangements where device 24 is a head-mounted display) or other suitable part of the user's body that is close to device 24. When device 10 is removed from recess 70, the user may place device 10 in any suitable location to provide haptic output in the desired location. For example, a user may wear device 24 on his or her head, may remove device 10 from device 24, and may place device 10 on a desk or other nearby surface to provide haptic output to the user's fingers or other body part.

Figure 14:
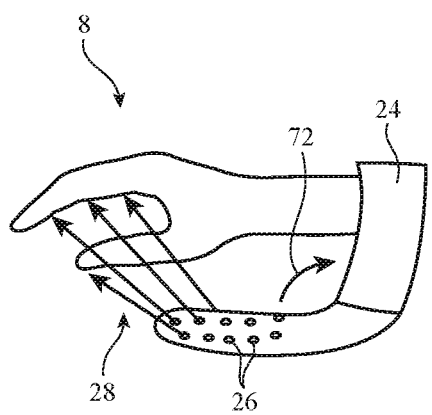
FIG. 14 is a perspective view of an illustrative electronic device having a retractable portion with ultrasonic haptic output components in accordance with an embodiment.

FIG. 14 is a perspective view of an illustrative arrangement in which ultrasonic components are mounted on a retractable structure. As shown in FIG. 14, device 24 may be worn on the user's wrist or other body part and may have one or more ultrasonic components 26. Ultrasonic components 26 may be mounted to a retractable portion of device 24. When in use, components 26 may extend out under the user's hand and may provide haptic output to the user's fingers. When not in use, components 26 may retract inward in direction 72 (e.g., so that device 24 appears more like a bracelet).

Figure 15:
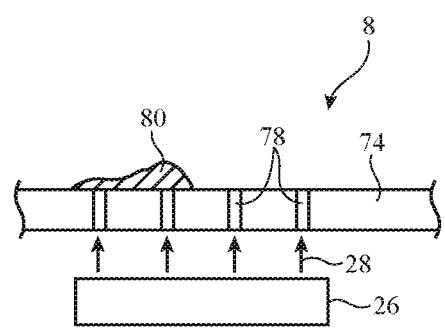
FIG. 15 is a cross-sectional side view of an illustrative electronic device having an ultrasonic haptic output device mounted behind openings in the electronic device in accordance with an embodiment.

FIG. 15 is a cross-sectional side view of an illustrative arrangement in which ultrasonic components are mounted behind a housing wall. As shown in FIG. 15, ultrasonic components 26 may be mounted behind housing wall 74. Housing wall 74 may be a housing for electronic device 24 and/or a housing for haptic output device 10. To allow haptic output 28 to exit through housing wall 74, housing wall 74 may include one or more openings such as perforations 78. Ultrasonic components 26 may emit ultrasonic signals 28 through perforations 78. If desired, ultrasonic components 26 may also be used to clear away debris 80 from perforations 78 by emitting ultrasonic waves that push debris 80 out and away from openings 78.

If desired, ultrasonic components 26 may be covered by a movable housing structure that can selectively hide and expose ultrasonic components 26. When ultrasonic components 26 are used to provide haptic output, an actuator may be used to move the movable housing structure to expose components 26. When ultrasonic components 26 are not in use, the movable housing structure may be moved to cover ultrasonic components 26 to hide components 26 from view.

Figure 16:
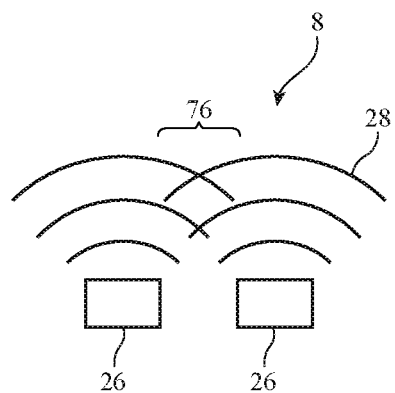
FIG. 16 is a diagram illustrating how adjacent haptic output devices may supply haptic output that exhibits constructive and destructive interference in accordance with an embodiment.

FIG. 16 is a diagram illustrating how multiple ultrasonic components 26 may be mounted adjacent to one another such that ultrasonic signals 28 from multiple components 26 can interfere in a desired way. Constructive interference and destructive interference may occur in regions where signals 28 from adjacent components interfere with one another (e.g., regions 76). Selectively producing constructive and destructive interference in signals 28 may be used to provide a desired sensation (or set of sensations) to the user.

It should be understood that the foregoing examples are merely illustrative and that the arrangements described can be combined in any suitable fashion. For example, the array of components 26 of FIG. 6 may be used on a wearable item such as wearable item 82 of FIG. 4; a movable support structure such as movable support structure 66 of FIG. 9 may be used with components 26 in any of devices 10 and/or devices 24; the housing holes of FIG. 15 may be used in the head-mounted device of FIG. 3; the removable haptic device 10 of FIG. 13 may be implemented in a base station of the type shown in FIG. 6 and/or in a handheld controller of the type shown in FIG. 5; and/or system 8 may include any other suitable combination of features shown in FIGS. 1-16.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). a person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
a display that displays content;
a sensor that detects a location of a user;
a housing having a retractable portion;
an ultrasonic haptic output device mounted in the retractable portion that provides haptic output to the user; and
control circuitry that controls a direction of the haptic output based on the content being displayed and the location of the user.

2. The system defined in claim 1 wherein the display comprises a head-mounted display.

3. The system defined in claim 1 wherein the ultrasonic haptic output device forms part of a speaker and wherein the display is selected from the group consisting of: a desktop computer display, a tablet computer display, and a laptop computer display.

4. The system defined in claim 1 wherein the ultrasonic haptic output device is mounted to a movable support structure.

5. The system defined in claim 1 wherein the ultrasonic haptic output device comprises first and second ultrasonic transducers that produce interfering ultrasonic signals.

6. The system defined in claim 1 wherein the ultrasonic haptic output device comprises an ultrasonic transducer selected from the group consisting of: an electromagnetic transducer, a piezoelectric transducer, and an electroactive polymer transducer.

7. The system defined in claim 1 wherein the content includes a virtual object and wherein the ultrasonic haptic output device directs the haptic output to the user's hands to simulate contact with the virtual object.

8. The system defined in claim 1 wherein the content includes a virtual environmental condition and wherein the ultrasonic haptic output device directs the haptic output to the user's face to simulate the virtual environmental condition.

9. The system defined in claim 1 wherein the ultrasonic haptic output device comprises an array of ultrasonic transducers that generate ultrasonic signals in different directions.

10. A head-mounted device, comprising:
a display that displays images;
an ultrasonic haptic output device that generates ultrasonic sound waves, wherein the ultrasonic haptic output device comprises a transducer mounted behind the display that is used to vibrate at least a portion of the display to generate the ultrasonic sound waves; and
control circuitry that controls a direction of the ultrasonic sound waves based on the images being displayed.

11. The head-mounted device defined in claim 10 wherein the ultrasonic haptic output device directs the ultrasonic sound waves towards a user's face.

12. The head-mounted device defined in claim 10 wherein the ultrasonic haptic output device directs the ultrasonic sound waves towards a user's hand.

13. The head-mounted device defined in claim 10 wherein the transducer is selected from the group consisting of: an electromagnetic transducer and a piezoelectric transducer.

14. The head-mounted device defined in claim 10 further comprising a housing having a recess that receives the ultrasonic haptic output device, wherein the ultrasonic haptic output device is configured to be removed from the recess and operated separately from the head-mounted device.

15. A system, comprising:
a display that displays image content; and
a haptic output device, comprising:
a sensor that produces sensor data;
an ultrasonic transducer that vibrates a membrane to produce ultrasonic signals;
a movable support structure to which the ultrasonic transducer is mounted; and
control circuitry that controls a position of the movable support structure and the ultrasonic transducer based on at least one of: the sensor data and the image content, wherein the movable support structure moves along a linear axis and rotates about a pivot point.

16. The system defined in claim 15 wherein the sensor data indicates a location of a user's finger and wherein the control circuitry controls the position of the movable support structure so that the ultrasonic signals are directed towards the location of the user's finger.

17. The system defined in claim 15 further comprising a housing having perforations, wherein the ultrasonic transducer emits the ultrasonic signals through the perforations.

* * * * *